(12) United States Patent
Park

(10) Patent No.: US 6,178,879 B1
(45) Date of Patent: Jan. 30, 2001

(54) PORTABLE ROASTER

(75) Inventor: Sang Geun Park, Jeongeup (KR)

(73) Assignee: Han Sung Enertec Co., Ltd., Jeongeup-Si (KR)

( * ) Notice: Under 35 U.S.C. 154(b), the term of this patent shall be extended for 0 days.

(21) Appl. No.: 09/575,796

(22) Filed: May 22, 2000

(30) Foreign Application Priority Data

Jan. 29, 2000 (KR) .................................................. 00-4512

(51) Int. Cl.$^7$ .............................. A47J 37/00; A47J 37/04; A47J 37/07
(52) U.S. Cl. ............................ 99/421 H; 99/419; 99/427; 99/448
(58) Field of Search ..................... 99/339, 340, 352–355, 99/400, 401, 419–421 V, 444–450, 426, 427, 481, 482, 467, 473–476, 516, 534–536; 126/25 R, 9 R, 9 B, 41 R, 27; 219/400, 401–404, 386

(56) References Cited

U.S. PATENT DOCUMENTS

| | | | |
|---|---|---|---|
| 1,263,331 | * 4/1918 | Lindroth | 99/446 |
| 2,618,730 | * 11/1952 | Panken | 99/421 H |
| 2,696,163 | * 12/1954 | Galley | 99/421 H |
| 2,762,293 | * 9/1956 | Boyajian | 99/421 P |
| 2,885,950 | * 5/1959 | Stoll et al. | 99/421 H |
| 3,104,605 | * 9/1963 | McKinney | 99/421 H |
| 3,125,015 | * 3/1964 | Schlaegel | 99/421 P |
| 3,196,776 | * 7/1965 | Norton | 99/421 P |
| 3,205,812 | * 9/1965 | Booth | 99/421 P |
| 3,296,957 | * 1/1967 | Gagnon et al. | 99/444 |
| 3,333,529 | * 8/1967 | Wilson | 99/421 P |
| 3,832,989 | * 9/1974 | Belford | 126/25 R |
| 4,214,516 | * 7/1980 | Friedl et al. | 99/447 |

* cited by examiner

*Primary Examiner*—Timothy F. Simone
(74) *Attorney, Agent, or Firm*—Jacobson, Price, Holman & Stern, PLLC

(57) ABSTRACT

The present invention relates to a portable roaster, which can make fire with charcoal as well as with gas, has a case for storing extra butane gas container, and can cook the meat evenly by rotating the meat. The portable roaster includes: a round shaped body having a gas nozzle portion of a bar shape, which extends back and forth at an inner and lower portion thereof, a pair of insertion holes formed at opposite sides of the body, a pair of covers respectively hinged at the front and rear portions of the body and having a plurality of ventilation holes, a gas container reception groove disposed at the front portion, the gas container reception groove in which a gas container is inserted to be connected to the gas nozzle portion for providing gas, and a gas control handle disposed at a portion of the gas container reception groove; and a rotary portion mounted on the rear cover, the rotary portion having a pair of support plates arranged at opposite sides of the rear cover, the lower ends of the support plates being inserted into the insertion holes of the body, a skewer bar rotatably disposed and extending between the opposite support plates, and a power supply portion mounted on one of the support plates to rotate the skewer bar.

4 Claims, 5 Drawing Sheets

PORTABLE ROASTER

BACKGROUND OF THE INVENTION

1. Field of the Invention

The present invention relates to a portable roaster for roasting flesh and meat using heat, and more particularly to, a portable roaster which can make fire with charcoal as well as with gas, has a case for storing extra butane gas container, and can cook the meat evenly by rotating the meat.

2. Description of the Related Art

In general, to cook food, portable roasters using a gas range or charcoal have been widely used.

The conventional roasters have a baking pan, which is heated by a separate heating power. As the heating power, butane gas or charcoal is used according to a user's taste.

The conventional roasters cook food such as meat by an indirect heat, that is, the food is cooked by heating the baking pan on which the food is put.

However, the conventional roasters send up smoke when roasting the food, since oil or water generated during cooking directly drops on the fire source. Additionally, the roasters are deteriorated in the efficiency of fire since the fire is not dispersed evenly but concentrated on certain portions.

That is, heat of fire is concentrated only on certain portions of the food which is in contact with the baking pan, and thereby the food cannot be cooked evenly and the food is deteriorated in its own taste. If a user makes the fire stronger to cook all parts of the food, the surface of the food is burnt. In order to cook the food evenly, the user must turn the food over continuously.

Furthermore, the roaster for butane gas requires only the butane gas and the roaster for charcoal fire requires only the charcoal as the fire source. Therefore, the user must prepare various kinds of roasters and fire sources to use according to the user's taste since the roasters cannot use both charcoal and butane gas.

SUMMARY OF THE INVENTION

It is an object of the present invention to provide a portable roaster in which both charcoal and butane gas can be used as a fire source.

It is another object of the present invention to provide a portable roaster which rotates the food to cook evenly.

It is a further object of the present invention to provide a portable roaster which cooks the food in the same effect as an oven, thereby preventing smoke from being generated.

To accomplish the above objects, the present invention provides a portable roaster including: a round shaped body having a gas nozzle portion of a bar shape, which extends back and forth at an inner and lower portion thereof, a pair of insertion holes formed at opposite sides of the body, a pair of covers respectively hinged at the front and rear portions of the body to cover the body, the covers having a plurality of ventilation holes, a gas container reception groove disposed at the front portion, the gas container reception groove in which a gas container is inserted to be connected to the gas nozzle portion for providing gas, and a gas control handle disposed at a portion of the gas container reception groove for controlling the volume of gas; and a rotary portion mounted on the rear cover, the rotary portion having a pair of support plates arranged at opposite sides of the rear cover, the lower ends of the support plates being inserted into the insertion holes of the body, a skewer bar rotatably disposed and extending between the opposite support plates, and a power supply portion mounted on one of the support plates to rotate the skewer bar.

BRIEF DESCRIPTION OF THE DRAWINGS

Understanding that these drawings depict only typical embodiments of the invention and are, therefore, not to be considered limiting of its scope, the invention will be described with additional specificity and detail through use of the accompanying drawings in which.

DETAILED DESCRIPTION OF THE PREFERRED EMBODIMENT

Figure 1:
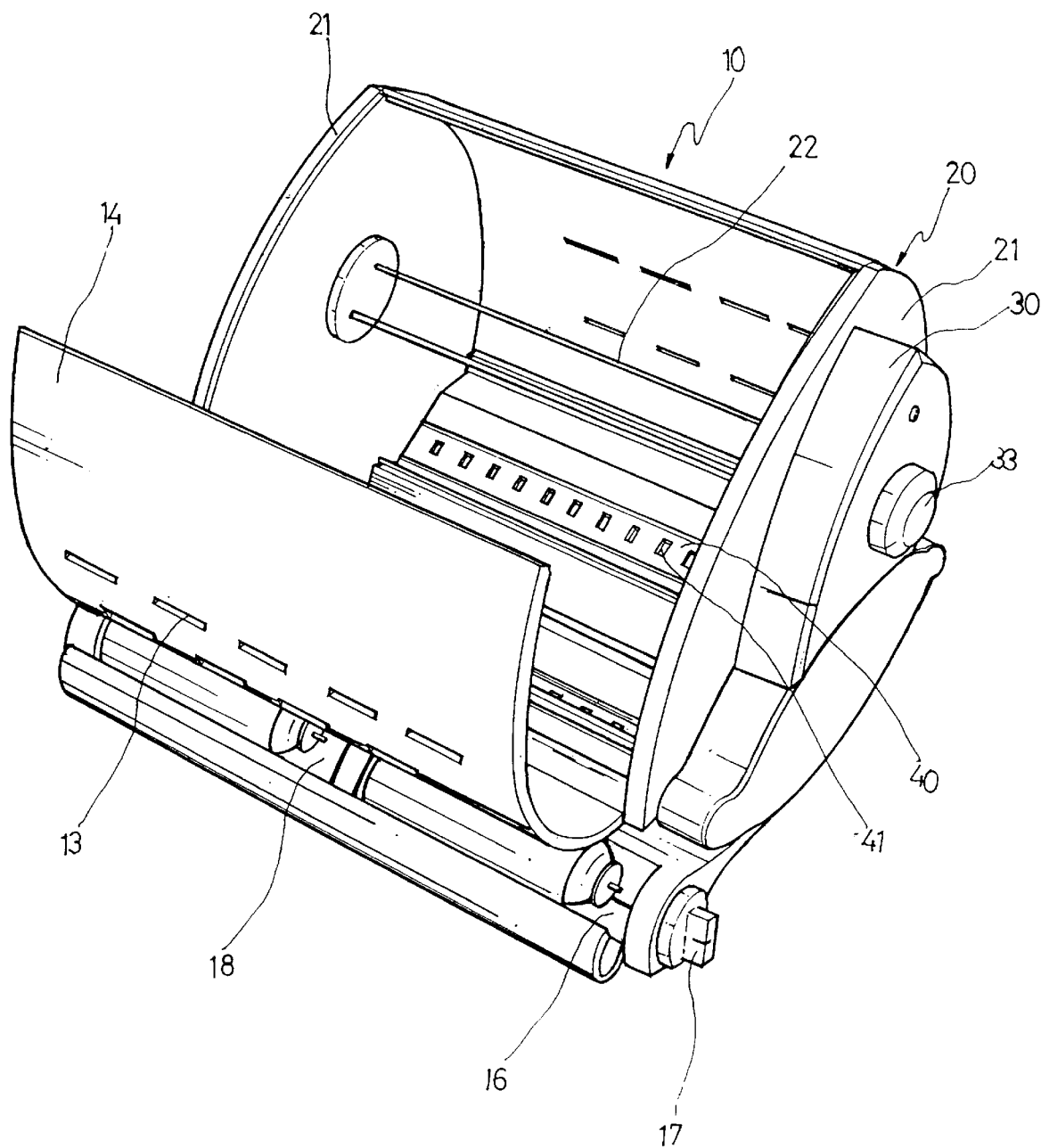
FIG. 1 is a perspective view of a portable roaster of an open mode according to the present invention.

The present invention will be described in detail hereinafter with reference to the accompanying drawings, wherein the same reference characters designate corresponding parts throughout several views. It is to be understood that these drawings depict only typical embodiments of the invention and are, therefore, not to be considered limiting of its scope.

As shown in the drawings, the portable roaster according to the present invention includes a gas nozzle portion 11 of a bar shape, which extends back and forth at an inner and lower portion of a round shaped body 10, a pair of insertion holes 12 formed at opposite sides of the body 10, a pair of covers 14 respectively hinged at the front and rear portions of the body 10 to cover the body 10 and have a plurality of ventilation holes 13, a gas container reception groove 16 disposed at the front portion of the body 10 and in which a gas container 15 is inserted to be connected to the gas nozzle portion 11 for providing gas, and a gas control handle 17 disposed at a portion of the gas container reception groove 16.

The covers 14 are arranged to seal the body 10 by covering the front and rear portions of the body 10. A rotary portion 20 is mounted on the rear cover 14. The rotary portion 20 includes a pair of support plates 21 arranged at opposite sides of the rear cover 14, a skewer bar 22 rotatably disposed and extending between the opposite support plates 21, and a power supply portion 30 mounted on one of the support plates 21 to rotate the skewer bar 22.

The lower ends of the support plates 21 are inserted into the insertion holes of the body 10.

The body 10 has twice length of the portable gas container 15. Besides the gas container reception groove 16, the portable roaster according to the present invention has a gas container storage case 18 for storing extra gas container. The gas container storage case 18 is disposed next to the gas container reception groove 16.

The power supply portion 30 for rotating the skewer bar 22 includes a clockwork 31 generating a driving power for producing a rotary power, a plurality of gears 32 for providing the rotary power of the clockwork 31 to the skewer bar 22, and a clockwork handle 33 for winding a spring of the clockwork 31.

The portable roaster according to the present invention generally utilizes heat, which is generated by gas combustion, as heat source. If necessary, the roaster can utilize solid fuel, such as charcoal, as heat source. For this, the roaster has a charcoal supporter 40, which is disposed on the upper portion of the gas nozzle portion 11 in the body 10. The charcoal supporter 40 has a plurality of holes 41 for discharging the force of the fire and is curved downward. A user puts the charcoal C in the charcoal supporter 40 located on the gas nozzle portion 11, and then, lights simply the charcoal by igniting gas of the gas container 15.

An oil discharge hole 19 is formed between the gas nozzle portions 11 for collecting and discharging water or fat produced from the food during cooking.

The portable roaster with the above structure functions as follows.

The user puts the gas container 15 into the gas container reception groove 16 and winds the spring of the clockwork 31 by rotating the clockwork handle 33.

After putting meat on the skewer bar 22, the user covers the body 10 with the covers 14. When the user lights the roaster using the gas control handle 17, the gas nozzle portion 11 discharges gas to light the roaster. The clockwork 31 of the power supply portion 30 is operated, and then, the skewer bar 22 is rotated by the rotation of the gears 32.

However, even though the spring of the clockwork 22 is completely loosed and the operation of the clockwork 22 and the rotation of the skewer bar 22 are stopped, the heat is applied to only a portion of the food so that the food is burnt since the roaster continuously generates heat. Therefore, the user must ascertain whether or not the power supply portion 30 is operated normally.

Water and fat produced from the roasted food is collected inside the oil discharge hole 19 formed between the gas nozzle portions 11 and discharged outside.

In consideration that meat roasted with fire of charcoal is more delicious than meat roasted with the fire of gas, the portable roaster according to the present invention is constructed to roast meat with fire of charcoal in lieu of fire of gas. For this, after the charcoal supporter 40 is put on the gas nozzle portion 11, charcoal is put into the charcoal supporter 40. The user can conveniently light charcoal by lighting gas of the gas container.

Figure 2:
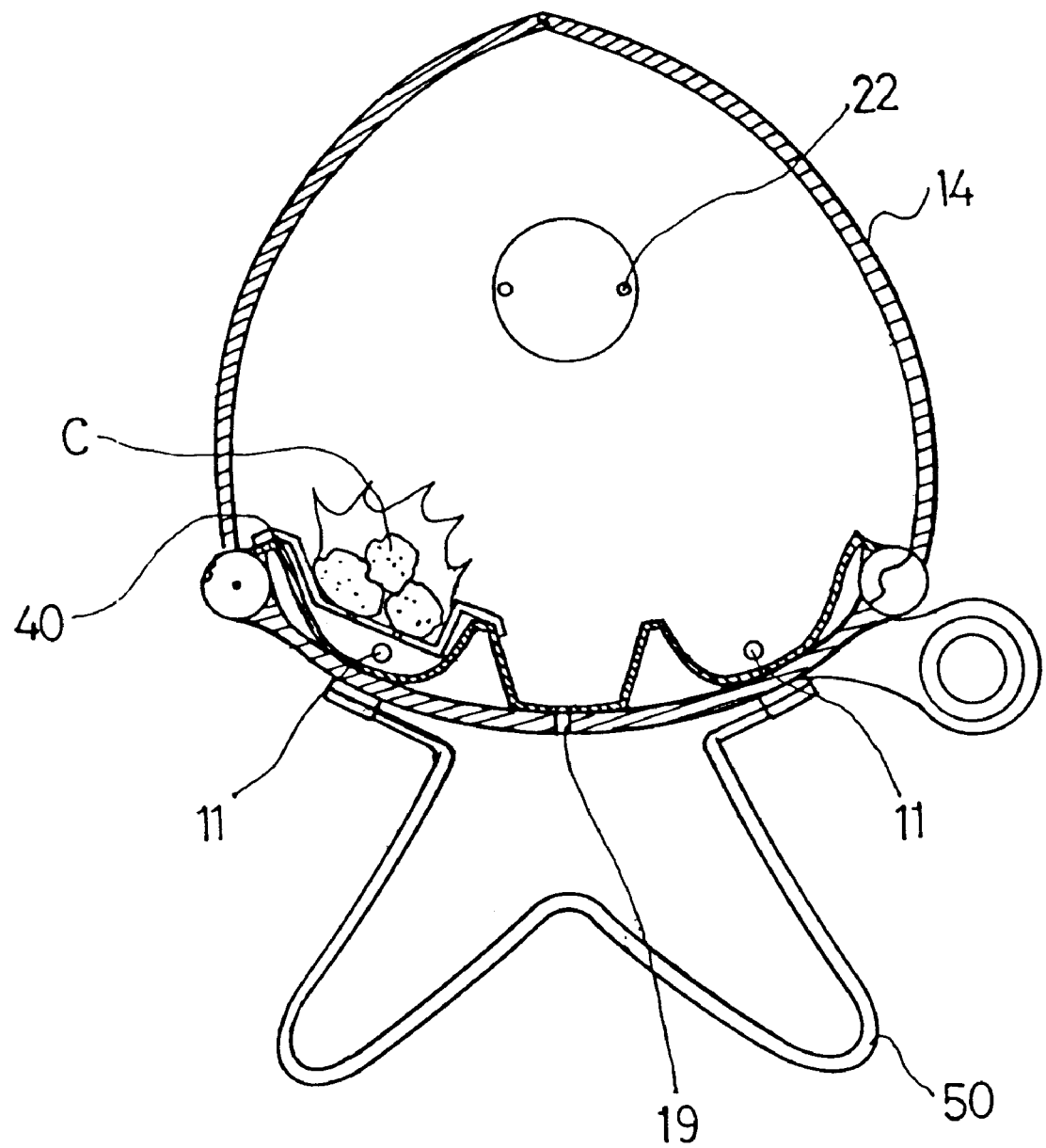
FIG. 2 is a side sectional view of the portable roaster according to the present invention.
Figure 3:
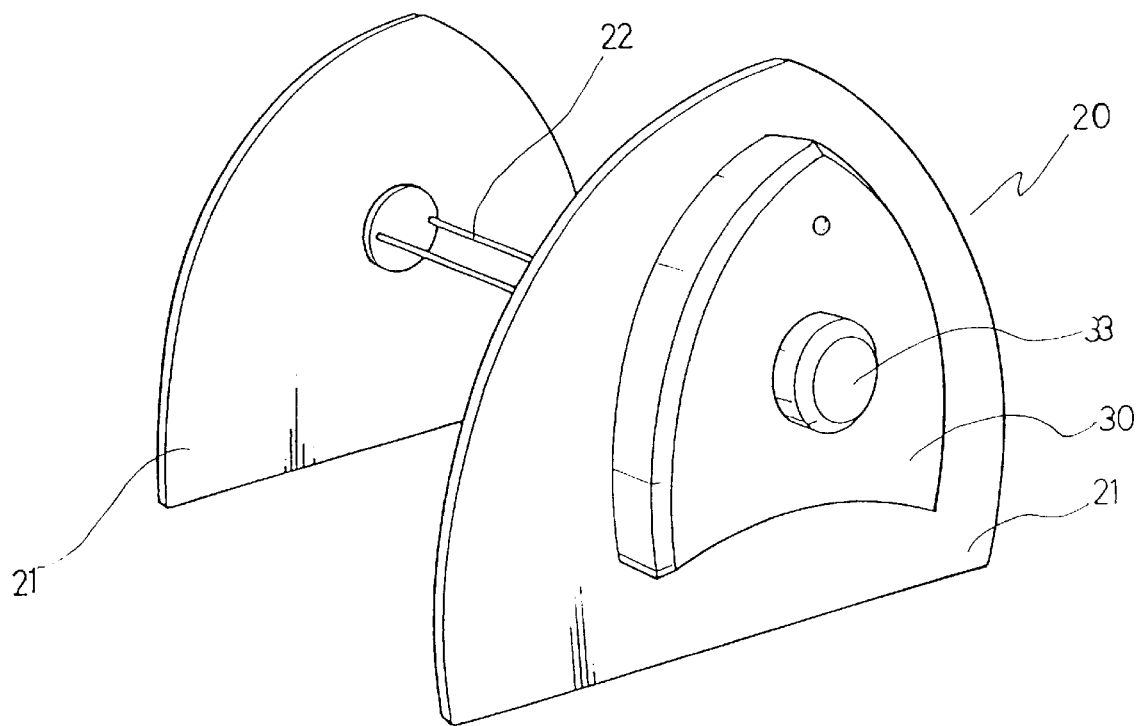
FIG. 3 is a perspective view of a rotary member of the portable roaster.
Figure 5:
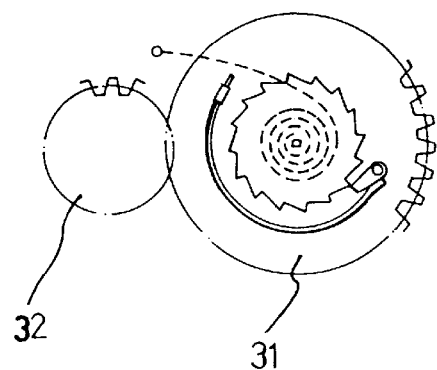
FIG. 5 is a schematic view of a driving portion of the rotary member.
Figure 4:
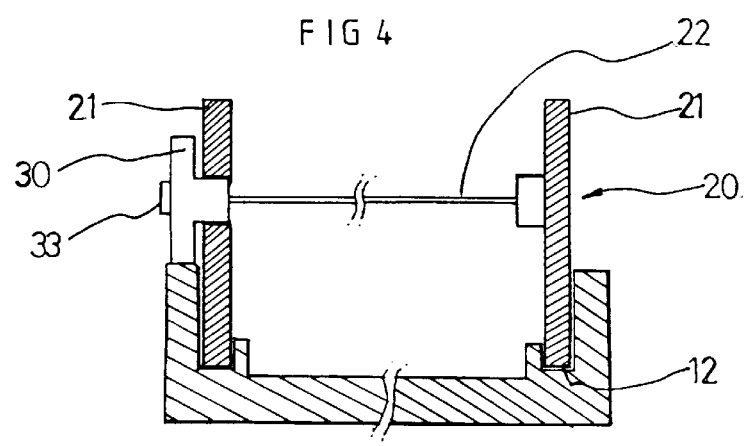
FIG. 4 is a sectional view illustrating an assembled state of the rotary member.
Figure 6:
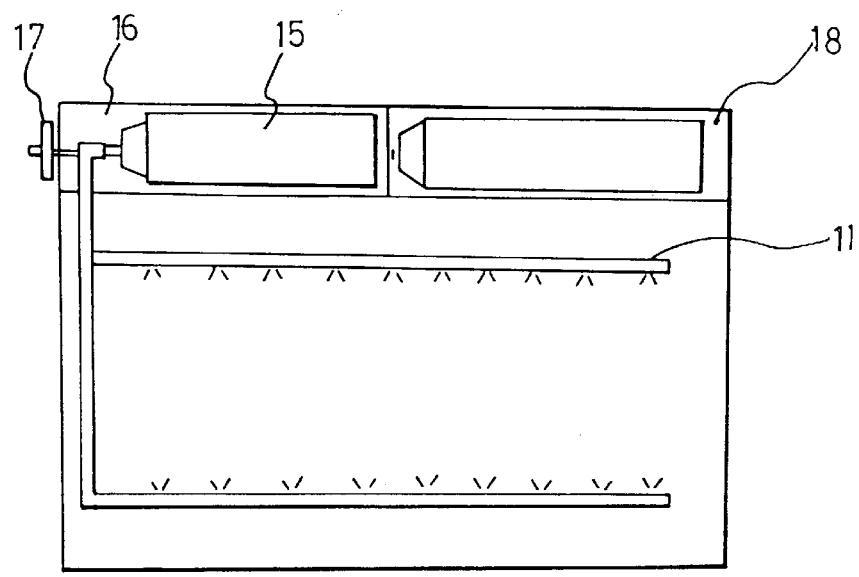
FIG. 6 is a schematic view of a gas nozzle portion of the portable roaster; and, FIG. 7 is a perspective view of an assembled state of the portable roaster.
Figure 7:
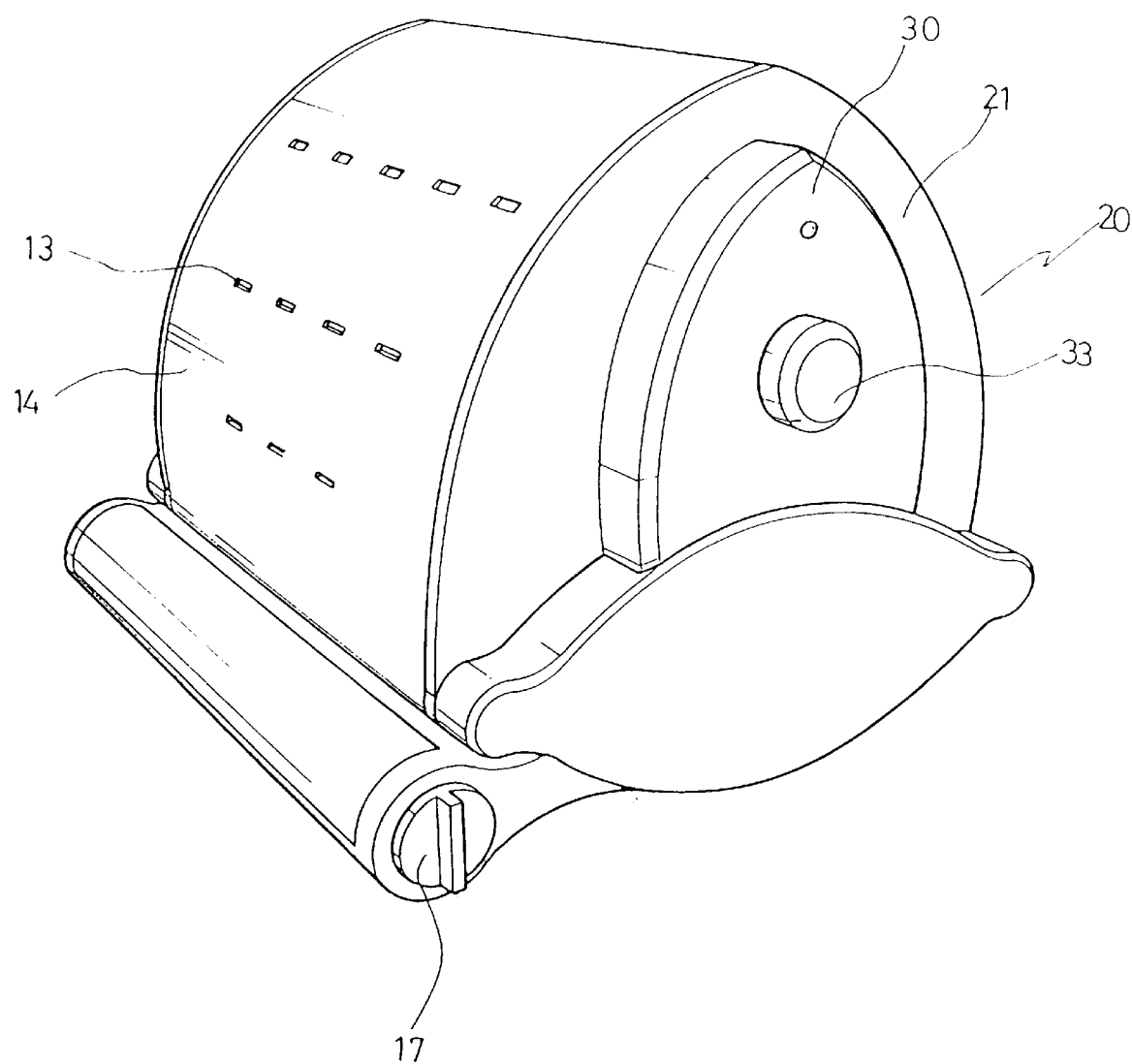

Compared with other charcoal roasters in which charcoal is lighted by using paper or other combustible materials, the portable roaster according to the present invention lights easily charcoal because charcoal is lighted with gas. The user can conveniently carry by separating the support plates 21 and the skewer bar 22 after separating the rotary portion 20 from the insertion holes 12. As shown in FIG. 2, it is preferable that a collapsible stand 50 is mounted on the bottom of the body 10.

As previously described above, the portable roaster can roast the meat evenly by using clockwork without additional power supply and use not only gas but also charcoal as fuel.

Those skilled in the art will readily recognize that these and various other modifications and changes may be made to the present invention without strictly following the exemplary application illustrated and described herein, and without departing from the true spirit and scope of the present invention, which is set forth in the following claims.

What is claimed is:

1. A portable roaster comprising:

a round shaped body having a gas nozzle portion of a bar shape, which extends back and forth at an inner and lower portion thereof, a pair of insertion holes formed at opposite sides of the body, a pair of covers respectively hinged at the front and rear portions of the body to cover the body, the covers having a plurality of ventilation holes, a gas container reception groove disposed at the front portion, the gas container reception groove in which a gas container is inserted to be connected to the gas nozzle portion for providing gas, and a gas control handle disposed at a portion of the gas container reception groove for controlling the volume of gas; and a rotary portion mounted on the rear cover, the rotary portion having a pair of support plates arranged at opposite sides of the rear cover, the lower ends of the support plates being inserted into the insertion holes of the body, a skewer bar rotatably disposed and extending between the opposite support plates, and a power supply portion mounted on one of the support plates to rotate the skewer bar.

2. A portable roaster as stated in claim 1, wherein the round shaped body further includes a gas container storage case for storing extra gas container, the gas container storage case being disposed next to the gas container reception groove.

3. A portable roaster as stated in claim 1, wherein the power supply portion includes a clockwork generating a driving power for producing a rotary power, a plurality of gears for providing the rotary power of the clockwork to the skewer bar, and a clockwork handle for winding a spring of the clockwork.

4. A portable roaster as stated in claim 1, wherein a charcoal supporter is disposed on the upper portion of the gas nozzle portion in the body, the charcoal supporter having a plurality of holes for discharging the force of the fire and being curved downward.

* * * * *